(12) United States Patent
Meyer et al.

(10) Patent No.: US 9,011,287 B2
(45) Date of Patent: Apr. 21, 2015

(54) DUAL PISTON TRANSMISSION CLUTCH

(75) Inventors: Kevin G. Meyer, Germantown Hills, IL (US); Peter A. Bezjak, Washington, IL (US); Jason R. Allen, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 307 days.

(21) Appl. No.: 13/487,152

(22) Filed: Jun. 1, 2012

(65) Prior Publication Data

US 2013/0324350 A1 Dec. 5, 2013

(51) Int. Cl.
| F16D 21/00 | (2006.01) |
| F16D 25/06 | (2006.01) |
| F16D 25/10 | (2006.01) |
| F16H 57/10 | (2006.01) |
| F16H 3/44 | (2006.01) |
| F16H 3/66 | (2006.01) |
| F16H 63/30 | (2006.01) |
| F16H 57/08 | (2006.01) |

(52) U.S. Cl.
CPC ........ *F16D 25/10* (2013.01); *F16H 3/44* (2013.01); *F16H 3/66* (2013.01); *F16H 63/3026* (2013.01); *F16H 2057/087* (2013.01); *F16H 2200/0069* (2013.01); *F16H 2200/2012* (2013.01); *F16H 2200/2046* (2013.01)

(58) Field of Classification Search
USPC ......... 192/85.25, 85.29, 85.32, 85.38, 48.616
See application file for complete search history.

(56) References Cited

U.S. PATENT DOCUMENTS

| RE27,937 E * | 3/1974 | Hensel ........................ 192/48.61 |
| 3,830,082 A | 8/1974 | Clauss, Jr. et al. |
| 4,238,020 A | 12/1980 | Nerstad et al. |
| 4,458,797 A | 7/1984 | Hawkins |
| 4,562,902 A | 1/1986 | Scibbe |
| 4,664,242 A | 5/1987 | Downs |
| 4,741,422 A * | 5/1988 | Fuehrer et al. ........... 192/48.617 |
| 5,232,411 A | 8/1993 | Hayashi et al. |
| 5,439,427 A | 8/1995 | Enokido et al. |
| 5,511,644 A | 4/1996 | Murata |
| 5,573,092 A | 11/1996 | Gabilondo |
| 5,701,976 A | 12/1997 | Kumagai et al. |
| 5,950,787 A * | 9/1999 | Murasugi et al. .......... 192/85.25 |
| 6,102,825 A | 8/2000 | Hisano et al. |

(Continued)

FOREIGN PATENT DOCUMENTS

| DE | 10256023 | 6/2004 |
| EP | 1635082 | 3/2006 |

(Continued)

OTHER PUBLICATIONS

Kevin G. Meyer, U.S. Appl, No. 12/965,624, filed Dec. 10, 2010, "Transmission Assembly Having Variable Force Clutch".

*Primary Examiner* — Justin Holmes
*Assistant Examiner* — Stacey Fluhart
(74) *Attorney, Agent, or Firm* — Miller, Matthias & Hull LLP

(57) ABSTRACT

A transmission assembly may include a first clutch and a second clutch. The second clutch may include a clutch pack, a pressure chamber, a first piston, and a second piston. The first piston may be configured to push against the clutch pack when pressurized fluid is directed into the pressure chamber. The second piston may be configured to push against the first piston when pressurized fluid is directed into the pressure chamber at a time when the first clutch is unactuated and inhibited from pushing against the first piston at a time when the first clutch is actuated.

17 Claims, 4 Drawing Sheets

(56) References Cited

U.S. PATENT DOCUMENTS

| | | |
|---|---|---|
| 6,949,042 B2 | 9/2005 | Eymuller et al. |
| 7,104,380 B2 | 9/2006 | Bishop et al. |
| 7,140,481 B2 * | 11/2006 | Hagenow .................. 192/85.42 |
| 2005/0130787 A1 | 6/2005 | Usoro et al. |
| 2005/0217962 A1 | 10/2005 | Pedersen et al. |
| 2006/0054444 A1 * | 3/2006 | Bishop et al. ............ 192/85 AA |
| 2007/0042858 A1 | 2/2007 | Raghavan et al. |
| 2007/0175726 A1 * | 8/2007 | Combes et al. ............ 192/87.11 |
| 2009/0023536 A1 | 1/2009 | Wittkopp et al. |
| 2009/0023539 A1 | 1/2009 | Wittkopp et al. |
| 2010/0210402 A1 | 8/2010 | Phillips et al. |
| 2012/0142485 A1 * | 6/2012 | Hoffman et al. .............. 475/271 |
| 2012/0149519 A1 * | 6/2012 | Meyer et al. .................. 475/116 |

FOREIGN PATENT DOCUMENTS

| | | |
|---|---|---|
| EP | 2063146 | 5/2009 |
| GB | 1287393 | 8/1972 |

* cited by examiner

Clutch Combination 290

| Gear | | 1F | 2F | 3F | 4F | 5F | 6F | 7F | 8F | 9F | 10F | 1R |
|---|---|---|---|---|---|---|---|---|---|---|---|---|
| Engaged Control Elements | | 1 4 6 | 1 5 6 | 1 4 5 | 1 3 5 | 1 3 4 | 1 2 5 | 1 2 4 | 1 2 3 | 2 3 4 | 2 4 5 | 3 4 6 |
| Clutch | 170 | X | X | X | X | X | X | X | X | | | |
| Clutch | 172 | | | X | X | | X | X | X | X | X | |
| Clutch | 174 | | X | X | | X | | | X | X | | X |
| Brake | 176 | X | | X | | X | | X | | X | X | X |
| Brake | 178 | | X | X | X | | X | | | | X | |
| Brake | 180 | X | X | | | | | | | | | X |

Torque

| | | 1F | 2F | 3F | 4F | 5F | 6F | 7F | 8F | 9F | 10F | 1R |
|---|---|---|---|---|---|---|---|---|---|---|---|---|
| Clutch | 170 | 4.10 | 4.10 | 4.10 | 3.51 | 2.81 | 1.78 | 1.06 | 0.45 | 0.00 | 0.00 | 0.00 |
| Clutch | 172 | 0.00 | 0.00 | 0.00 | 0.00 | 0.00 | 0.57 | 0.74 | 1.00 | 1.19 | 1.00 | 0.00 |
| Clutch | 174 | 0.00 | 0.00 | 0.00 | 0.59 | 1.29 | 0.00 | 0.00 | -0.45 | -0.78 | 0.60 | 4.10 |
| Brake | 176 | 0.94 | 0.00 | -0.79 | 0.00 | 0.94 | 0.00 | 0.24 | 0.00 | -0.18 | 0.60 | 0.94 |
| Brake | 178 | 0.00 | 1.42 | 2.61 | 1.42 | 0.00 | 0.61 | 0.00 | 0.00 | 0.00 | -0.91 | 0.00 |
| Brake | 180 | 2.86 | 1.31 | 0.00 | 0.00 | 0.00 | 0.00 | 0.00 | 0.00 | 0.00 | 0.00 | -6.23 |

FIG. 2

DUAL PISTON TRANSMISSION CLUTCH

TECHNICAL FIELD

The present disclosure relates generally to a transmission assembly, and more particularly, to a transmission assembly having a variable force, dual piston clutch.

BACKGROUND

Machines such as articulated haul trucks and off-highway mining trucks include an engine that provides power to wheels of the trucks via a planetary-type transmission. A planetary-type transmission is generally made up of at least three different elements, including a sun gear, a planet carrier having at least one set of planet gears, and a ring gear. The planet gears of the planet carrier mesh with the sun gear and the ring gear. One of the sun gear, planet carrier and ring gear is driven as an input to the transmission, while another of the sun gear, planet carrier, and ring gear rotates as an output of the transmission. The sun gear, planet carrier, planet gears, and ring gear can all rotate simultaneously to transmit power from the input to the output at a first ratio of speed-to-torque and in a forward direction or, alternatively, one of the sun gear, planet carrier, and ring gear can be selectively held stationary or locked to rotate with another gear and thereby transmit power from the input to the output at a second ratio of speed-to-torque and/or in a reverse direction. The change in rotational direction and/or speed-to-torque ratio of the transmission depends upon the number of teeth in the sun and ring gears, the gear(s) that is selected as the input, the gear(s) that is selected as the output, and which gear, if any, is held stationary or rotationally locked with another gear. A hydraulic clutch (also commonly referred to as a brake) is used to hold particular gears stationary and/or to lock the rotation of particular gears together.

The amount of resistive torque required to hold a gear stationary or to lock the rotation of one gear together with another gear can vary. For example, when operating in a low reverse gear, significantly more torque may be required from a particular clutch than required from the same clutch during operation in a forward high gear. When the clutch is capable of providing only a single level of torque (i.e., the highest level required during any operation), shifting of the transmission between reverse and forward gears when only a small amount of resistive torque is required can be too rapid, resulting in rough operation that is uncomfortable for an operator of the machine and possibly damaging to the machine.

One attempt to improve shift quality is described in U.S. Pat. No. 7,140,481 (the '481 patent) by Hagenow that issued on Nov. 28, 2010. Specifically, the '481 patent discloses a clutch piston amplifier assembly provided for applying different levels of pressure to a clutch pack to engage a first member and a second member of an automatic transmission. The clutch amplifier assembly includes a piston chamber, and a stage separator plate provided in the piston chamber to divide the piston chamber into a first chamber portion and a second chamber portion. The clutch amplifier assembly also includes an apply piston provided in the first chamber portion and having an axially extending arm which engages the clutch pack for applying axial pressure thereto, and an amplifier piston provided in the second chamber portion. Amplifier drive pins are provided between and engaged with both the apply piston and the amplifier piston, and a return spring is located between the apply piston and a wall of the piston chamber. During operation, pressurized fluid is directed into the first chamber portion to move the apply piston against the spring and generate a first pressure on the clutch pack (i.e., a first resistive torque on the first and second members). Pressurized fluid can also or alternatively be directed into the second chamber portion to move the amplifier piston against the drive pin, which pushes on the apply piston to increase the pressure or provide a different level of pressure on the clutch pack. In this manner, three levels of pressure (apply piston pressure, amplifier piston pressure, or apply piston pressure+ amplifier piston pressure) are available, thereby allowing for tunability of the pressure and a resulting smoother shift operation.

Although the assembly of the '481 patent may improve shift quality, it may be complicated and difficult to control. Specifically, different valving for each of the first and second chamber portions may be required to appropriately control the flows of pressurized fluid. In addition, regulation of the different valving may require precise timing and complex control. Further, use of the amplifier drive pins may increase a cost of the system, provide a potential leak path for pressurized fluid, and reduce a durability of the system.

The disclosed transmission assembly is directed to overcoming one or more of the problems set forth above and/or other problems of the prior art.

SUMMARY

In one aspect, the present disclosure is directed to a transmission assembly including a first clutch and a second clutch. The second clutch may include a clutch pack, a pressure chamber, a first piston, and a second piston. The first piston may be configured to push against the clutch pack when pressurized fluid is directed into the pressure chamber. The second piston may be configured to push against the first piston when pressurized fluid is directed into the pressure chamber at a time when the first clutch is unactuated and inhibited from pushing against the first piston at a time when the first clutch is actuated.

In another aspect, the present disclosure is directed to a method of operating a transmission. The method may include actuating a first clutch by pressurizing a first chamber of a first clutch to generate a first resistive torque on a first clutch pack during a transmission operation in a first gear and actuating the first clutch and a second clutch during a transmission operation in a second gear to generate a second resistive torque on the first clutch pack less than the first resistive torque. The step of actuating the first clutch and the second clutch may include pressurizing the first chamber and actuating a control valve to direct pressurized fluid to both the second clutch and a second chamber of the first clutch. The pressurized fluid in the second chamber may inhibit a force applied to the first clutch pack to generate the second resistive torque.

In another aspect, the present disclosure is directed to a transmission assembly including a housing, a sun gear, a ring gear, a first planet carrier, and a second planet carrier. The first clutch may be configured to selectively lock the sun gear to the ring gear in a first gear and a second gear, and a second clutch may be configured to selectively lock the first planet carrier to the second planet carrier in the second gear. The assembly may include a first chamber, a second chamber, and a control valve configured to direct pressurized fluid to both the second clutch and the second chamber when the second clutch is activated. A first piston may be configured to push against the first clutch pack with a first force when pressurized fluid is directed into the first chamber during operation of the transmission in the first gear and the second gear. A second piston may be configured to push against the first piston with a second force when pressurized fluid is directed into the first chamber during operation of the transmission in the first gear, and inhibited from pushing against the first piston when pressurized fluid is directed into the second chamber during operation in the second gear. The second force may be supplemental to the first force.

BRIEF DESCRIPTION OF THE DRAWINGS

FIG. 2 is a truth table depicting exemplary disclosed gear combinations of the transmission assembly of FIG. 1;

DETAILED DESCRIPTION

Figure 1:
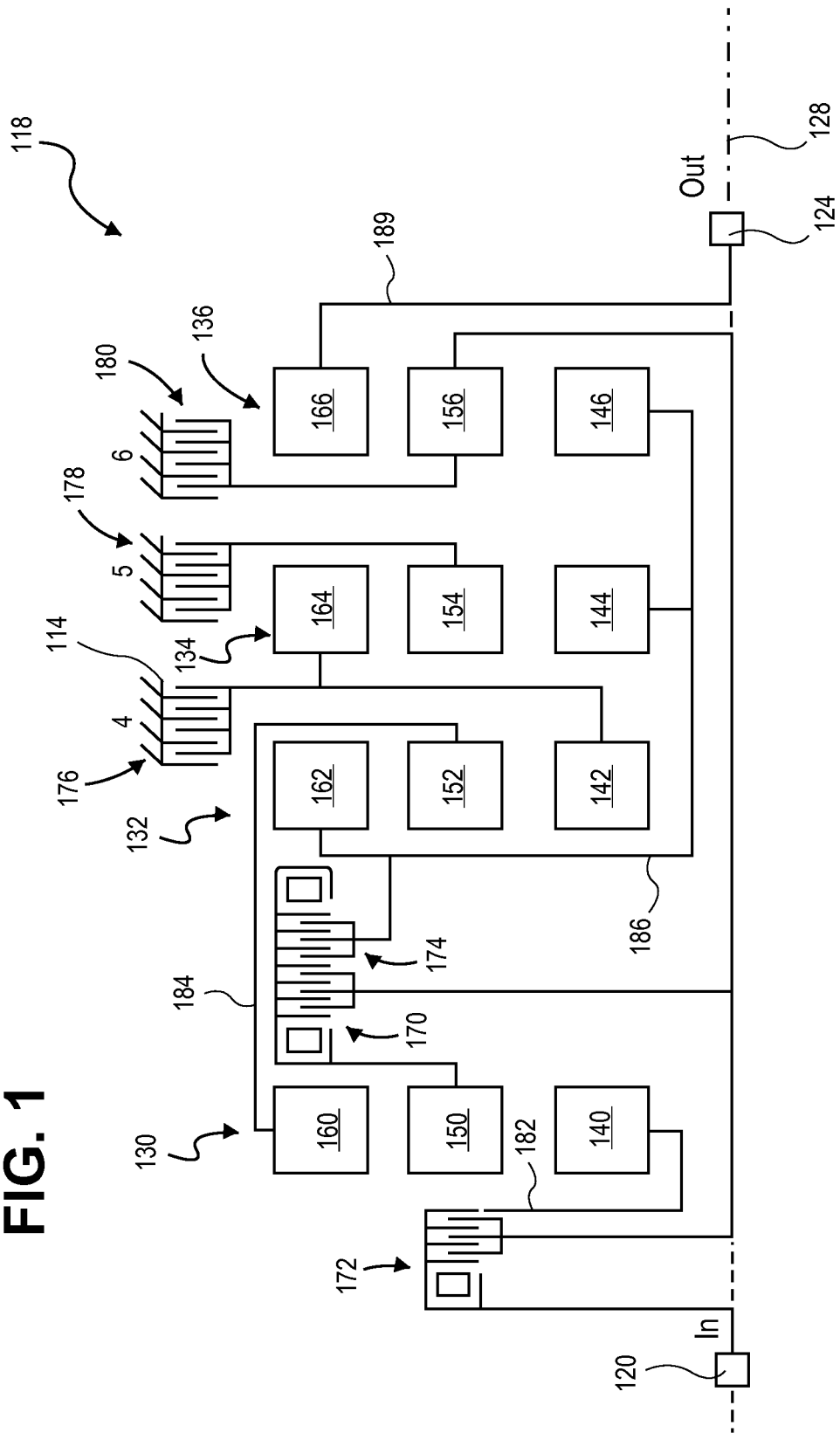
FIG. 1 is a schematic illustration of an exemplary disclosed transmission assembly in accordance with various aspects of the disclosure.

An exemplary embodiment of a transmission assembly 118 is illustrated in FIG. 1. The transmission assembly 118 may be employed in a mobile machine (not shown) that may perform a predetermined task at a worksite. For example, the machine may embody a mobile machine such as an off-highway mining truck, a wheel loader, a motor grader, an articulated haul truck, or any other mobile machine known in the art. The worksite may include, for example, a mine site, a landfill, a quarry, a construction site, or another type of worksite. The predetermined task performed by the machine may require the machine to generally traverse the worksite between different destinations. Accordingly, the machine may be provided with a power train (not shown) that facilitates travel between the different destinations at the worksite.

The power train may generally include an engine (not shown) and the transmission assembly 118. The engine may embody any type of engine known in the art, for example, a diesel, gasoline, or gaseous-fuel powered, internal combustion engine configured to generate a mechanical power output. The transmission assembly 118 may include an input member 120 connecting the transmission assembly 118 to the mechanical power output of the engine via a torque converter (not shown), and an output member 124 connecting the transmission assembly 118 to one or more traction devices (not shown). As will be described in more detail below, the transmission assembly 118 may embody a mechanical step-change transmission having at least one reverse gear ratio and a plurality of forward gear ratios. Each of the different gear ratios may be manually or automatically selected to provide a different ratio of speed-to-torque in either the forward or reverse travel directions.

FIG. 1 schematically illustrates one half of transmission assembly 118 located to the side of a rotational axis of symmetry (axis) 128. Input member 120 and output member 124 may be aligned along axis 128. Transmission assembly 118 may generally include a stationary housing 114, and four different planetary gear assembly 130, 132, 134, and 136 disposed within the housing 114 and rotatably supported and aligned along axis 128. It is contemplated that transmission assembly 118 could include a greater or lesser number of planetary gear assemblies, as desired. The structure of the different gears, input members, output members, and connections therebetween can be achieved using conventional components.

In the disclosed embodiment, each of planetary gear assemblies 130-136 may include multiple interconnected components. Specifically, each of planetary gear assemblies 130-136 may include a sun gear 140-146, a planet carrier 150-156, and a ring gear 160-166, respectively. The sun gear 140 of the planetary gear assembly 130 may be fixed to rotate with the input member 120 via a coupling 182, while the ring gear 160, also of the planetary gear assembly 130, may be fixed to rotate with the planet carrier 152 of the planetary gear assembly 132 via a coupling 184. The ring gear 162 of the planetary gear assembly 132 may be fixed to rotate with the sun gears 144 and 146 of the planetary gear assemblies 134 and 136 via a coupling 186. The sun gear 142 of the planetary gear assembly 132 may be fixed to rotate with the ring gear 164 of the planetary gear assembly 134 via a coupling 188. Finally, the ring gear 166 of the planetary gear assembly 136 may be fixed to rotate with the output member 124 via a coupling 189.

Transmission assembly 118 may also include a plurality of clutches selectively actuated to exert torque on portions of the couplings 182-189, the sun gears 140-146, the planet carriers 150-156, and/or the ring gears 160-166 that resist relative rotations between components and thereby rotationally lock the components to each other and/or to housing 114 in a variety of different configurations. These connections may facilitate a modification of the speed-to-torque ratio and/or the rotational direction received at the input member 120 relative to the speed-to-torque ratio and rotational direction delivered to the output member 124.

In the disclosed embodiment, the transmission assembly 118 includes six different clutches 170, 172, 174, 176, 178, and 180. It is contemplated, however, that the transmission assembly 118 could include a greater or lesser number of clutches, as desired. Clutch 170 may be configured to selectively connect the planet carrier 156 with the planet carrier 150. Clutch 172 may be configured to selectively connect the planet carrier 156 to the coupling 182, that is, to the input member 120 and the sun gear 140. Clutch 174 may be configured to selectively connect the planet carrier 150 to the coupling 186, that is, to the sun gears 144, 146 and the ring gear 162. Clutch 176 may be configured to selectively connect the coupling 188, that is, the sun gear 142 and the ring gear 164, to the housing 114. Clutch 178 may be configured to selectively connect the planet carrier 154 to the housing 114. Clutch 180 may be configured to selectively connect the planet carrier 156 to the housing 114.

FIG. 2 discloses a truth table 290 describing possible engagement combinations of the clutches 170-180, which establish ten forward gear ratios and one reverse gear ratio between the input member 120 and the output member 124 by way of the planetary gear assemblies 130-136. For example, to achieve the first forward gear ratio, clutches 170, 176, and 180 are shown to be simultaneously actuated to engage the corresponding components and exert resistive torques of about 4.10, 0.94, and 2.86 times a torque received at the input member 120, respectively, and thereby rotationally lock the corresponding components. Similarly, to achieve the fourth forward gear ratio, clutches 170, 174, and 178 are shown to be simultaneously actuated to engage the corresponding components and exert resistive torques of about 3.51, 0.59, and 1.42 times a torque received at the input member 120, respectively, and thereby rotationally lock the corresponding components. In another example, the reverse gear ratio is shown to be achieved by simultaneously actuating the clutches 174, 176, and 180 to engage the corresponding components and exert resistive torque of about 4.10, 0.94, and −6.23 times the input torque, respectively, and thereby rotationally lock the components.

As can be seen from a comparison of the conditions surrounding operation of the transmission assembly 118 in the fourth forward gear ratio and the reverse gear ratio, the range of resistive torque required by the clutch 170 to rotationally lock the corresponding components can be significant. Specifically, when shifting from the third forward gear ratio to the fourth forward gear ratio, the clutch 174 may only be required to exert a resistive torque of 0.59 times the input torque to sufficiently lock the planet carrier 150 to the coupling 186, that is, to sun gear 146 and ring gear 162. Similarly, when shifting from the seventh forward gear ratio to the eighth forward gear ratio, the clutch 174 may only be required to exert a resistive torque of −0.45 times the input torque to sufficiently lock the planet carrier 150 to the coupling 186. However, when shifting into the reverse gear ratio, clutch 174 may be required to exert a resistive torque of 4.10 times the input torque to sufficiently lock the planet carrier 150 to the coupling 186, which is more than six times greater than required during shifting to the fourth and eighth forward gear ratios. If unaccounted for, this extreme range of resistive torque could cause clutch 174 to engage too quickly during shifting to the fourth and eighth forward gear ratios at the lower torque level (with clutch 174 designed to accommodate the much higher resistive torque of the reverse gear ratio), resulting in a sudden and jerky shift.

Figure 3:
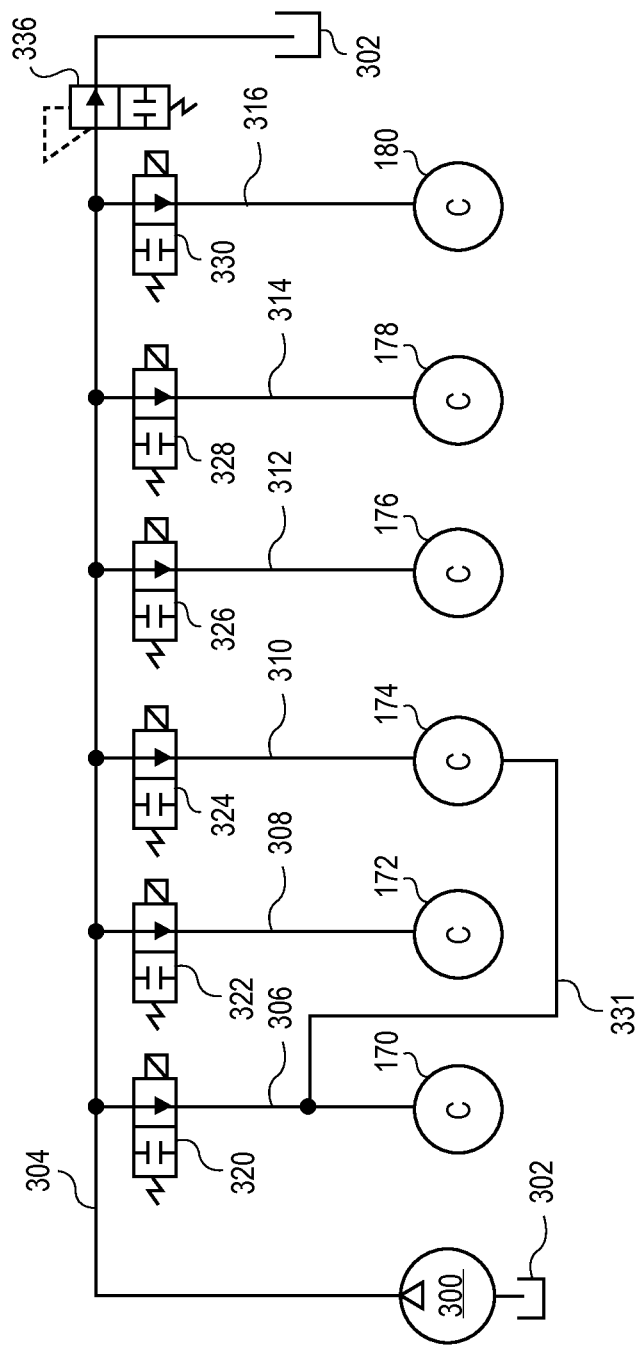
FIG. 3 is a schematic illustration of an exemplary disclosed hydraulic circuit for the transmission assembly of FIG. 1.

As shown in FIG. 3, the clutches 170-180 may be selectively supplied with hydraulic fluid to engage and connect the corresponding components described above. In particular, the transmission assembly 118 may include a pump 300 configured to draw fluid from a low pressure supply 302, pressurize the fluid, and direct the pressurized fluid in parallel to the clutches 170-180 by way of a manifold 304 and a plurality of distribution lines 306, 308, 310, 312, 314, and 316, respectively. Each of the clutches 170-180, as will be described in more detail below, may include one or more interior actuating chambers that, when filled with the pressurized fluid, displaces one or more pistons moving the piston(s) toward one or more clutch packs. As a piston "touches up" to a clutch pack, the actuating chamber(s) of the clutch is full of fluid and the clutch is engaged to rotationally lock the corresponding components. As described in connection with FIG. 2 above, the combination of engaged clutches may determine the output speed-to-torque ratio and the rotational direction of transmission assembly 118.

A plurality of control valves 320, 322, 324, 326, 328, and 330 may be disposed within the distribution lines 306-316, respectively, between the manifold 304 and the clutches 170-180. The control valves 320-330 may be selectively energized, based on operator or automatic transmission controller commands, to regulate flows of pressurized fluid to the interior actuating chambers of the clutches 170-180. In one example, each of control valves 320-330 may include a two-position, two-way valve mechanism (not shown) that is solenoid operated to actuate one or more of the clutches 170-180. Each of the valve mechanisms may be movable between an open or flow-passing position at which fluid is allowed to flow into an associated actuating chamber, and a closed or flow-blocking position at which fluid flow is blocked from the actuating chamber. It is contemplated that each control valve 320-330 may include additional or different mechanisms, if desired, such as a proportional valve mechanism, a pilot valve mechanism configured to control a pressure of the fluid entering the two-position valve mechanisms and interior actuating chamber of the associated clutch or clutches, or any other mechanisms known in the art. It is further contemplated that a single control valve 320-330 may be associated with more than one of clutches 170-180, and vice versa.

A pressure relief valve 336 may be disposed within the manifold 304 downstream of the distribution lines 306-316 and configured to selectively pass fluid to the low-pressure supply 302 in response to a pressure of the fluid within the manifold 304. By way of example, the pressure relief valve 336 may include a valve element that is spring biased toward a flow-blocking position and movable toward a flow-passing position in response to a pressure of the fluid within manifold 304. When the pressure within the manifold 304 exceeds a predetermined threshold, the force generated by the fluid pressure acting on the valve element may overcome the spring force allowing the valve element to move to the flow-passing position. In this manner, the pressure relief valve 336 may function to maintain a desired pressure within the manifold 304.

Figure 4:
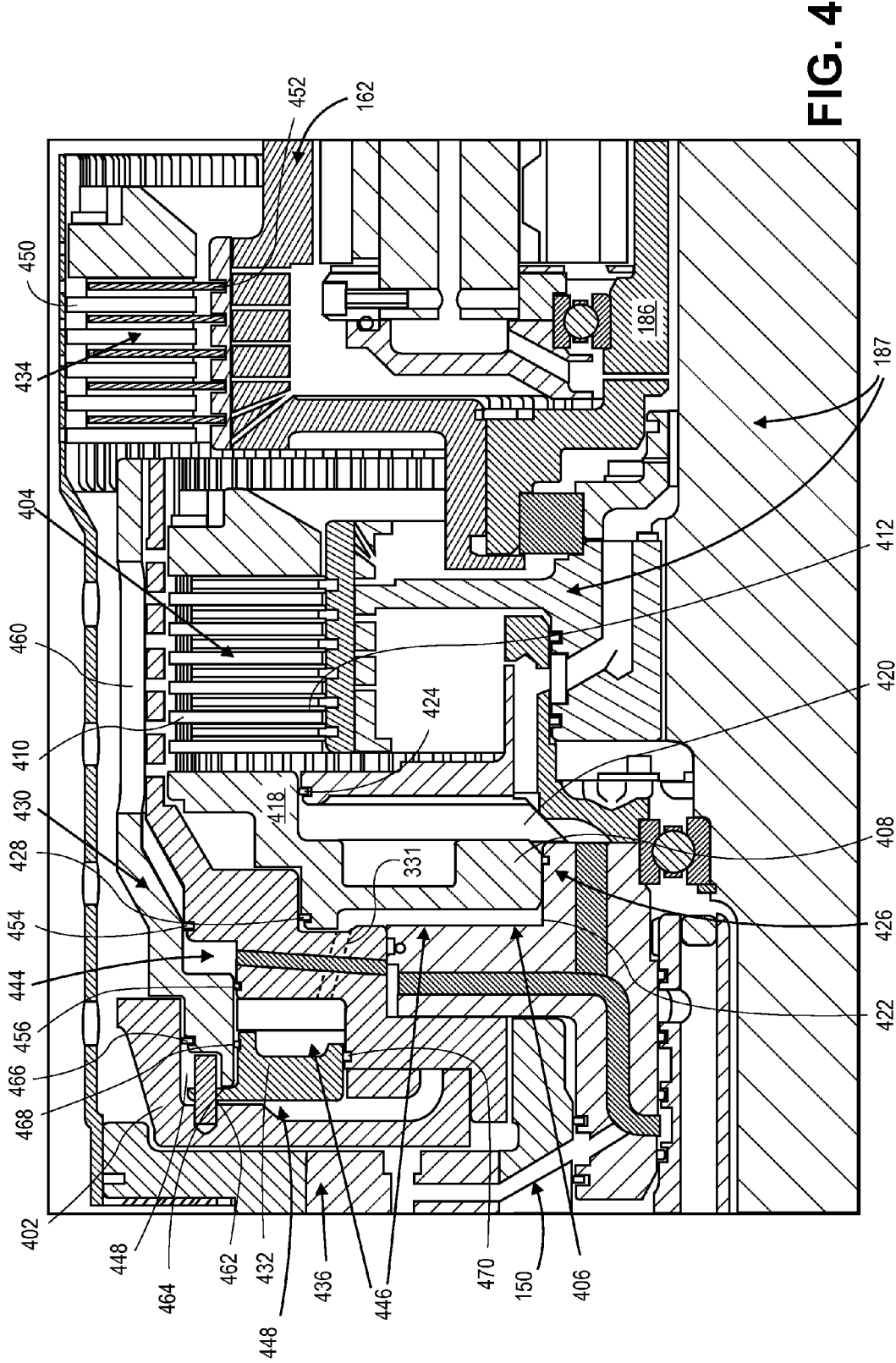
FIG. 4 is a cross-sectional illustration of a portion of the transmission assembly of FIG. 1.

Referring to FIGS. 3 and 4, the control valve 320 may be associated with the clutch 170 and with the clutch 174. FIG. 4 illustrates an exemplary design of the clutches 170 and 174 corresponding to the hydraulic circuit of FIG. 3. The clutches 170, 174 may include a clutch housing 402. The clutch 170 may include a clutch pack 404 disposed within the clutch housing 402, and a clutch actuator 406 also disposed within the clutch housing 402. The clutch actuator 406 may be selectively supplied with pressurized fluid from the manifold 304 via the control valve 320 (referring to FIG. 3) to push on the clutch pack 404 and thereby engage clutch 170. The clutch housing 402 may be a generally hollow vessel configured to annularly enclose a portion of planet carrier 150 and a portion of planet carrier 156 with clutch pack 404 disposed therebetween. Planet carrier 156 (not illustrated in FIG. 4) may be positioned off the right side of the view illustrated in FIG. 4 and coupled to clutch 170 via a coupling 187, for example, a hub and shaft connecting member.

Clutch pack 404 may be disposed within a recess of the clutch housing 402 and may include a first plurality of disks 410 and a second plurality of disks 412 evenly distributed between disks 410. Disks 410 may include gear teeth intermesh with planet carrier 150, while disks 412 may include gear teeth that intermesh with planet carrier 156. Disks 410 and/or disks 412 may have friction material bonded to their surface and, when clutch pack 404 is pushed on by clutch actuator 406, disks 410 and 412 may be pressed together and become rotationally locked. When disks 410 and 412 are locked, planet carrier 150 may be rotationally locked to planet carrier 156.

The clutch actuator 406 may be a hydraulic actuator selectively supplied with pressurized fluid to generate an axial force directed to an end of the clutch pack 404 and thereby engage clutch 170. In particular, the clutch actuator 406 may include a piston 408 enclosed by the clutch housing 402. The piston 408 may include an arm portion 418 that extends radially outward to press on an end of the clutch pack 404. A chamber 420 defined by the housing 402 may be disposed between the piston 408 and the clutch pack 404 and may contain fluid at a relatively low pressure, such as, for example, fluid at lube pressure, to bias the piston 408 away from the clutch pack 404. A seal 424 may be located between an inner annular surface of the arm portion 418 to seal an outer radial portion of the chamber 420. Another seal 426 may be located between an inner annular surface of the piston 408 and a portion of the housing 402 to seal an inner radial portion of the chamber 420.

The housing 402 may define a pressure chamber 422 in fluid communication with the distribution line 306 and the control valve 320 (referring to FIG. 3). A seal 428 may be located at an outer annular surface of the piston 408 to seal an outer radial portion of pressure chamber 422, while seal 426 may seal an inner radial portion of pressure chamber 422. When the control valve 320 (referring to FIG. 3) is moved to the flow-passing position to fill the pressure chamber 422 with pressurized fluid, the piston 408 may be urged to press against the clutch pack 404 with a first force resulting in a first torque on planet carrier 150 and planet carrier 156 resisting relative rotations.

The clutch 174 may include a clutch pack 434 disposed within the clutch housing 402 and a clutch actuator 436 also disposed within the clutch housing 402. The clutch actuator 436 may be selectively supplied with pressurized fluid from the manifold 304 via the control valve 324 (referring to FIG. 3) to push on the clutch pack 434 and thereby engage the clutch 174. The clutch housing 402 may be configured to annularly enclose a coupling 186 between ring gear 162 and sun gears 144, 146, with clutch pack 434 disposed therebetween. Sun gears 144 and 146 (not illustrated in FIG. 4) may be positioned off to the right side of the coupling 186 in the view illustrated in FIG. 4.

Clutch pack 434 may be disposed within a recess of the clutch housing 402 and may include a first plurality of disks 450 and a second plurality of disks 452 evenly distributed between disks 450. Disks 450 may include gear teeth that intermesh with planet carrier 150, while disks 452 may include gear teeth that intermesh with a coupling 186 (i.e., ring gear 162 and sun gears 144, 146). Disks 450 and/or disks 452 may have friction material bonded to their surface and, when clutch pack 434 is pushed on by clutch actuator 436, disks 450 and 452 may be pressed together and become rotationally locked. When disks 450 and 452 are locked, planet carrier 150 may be rotationally locked to coupling 186 (i.e., ring gear 162 and sun gears 144, 146).

The clutch actuator 436 may be, for example, a hydraulic actuator selectively supplied with pressurized fluid to generate an axial force directed to an end of the clutch pack 434 and thereby engage clutch 174. In particular, the clutch actuator 436 may include a first piston 430 and a second piston 432 enclosed by the housing 402.

The first and second pistons 430, 432, together, may axially divide a recess of the housing 402 into a first chamber 444 and a second chamber 446. The first chamber 444 may be disposed between the first piston 430 and a portion of the housing 402 and may contain fluid at a relatively low pressure, such as, for example, fluid at lube pressure, to bias the first piston 430 away from the clutch pack 434. The first piston 430 may include an axially-extending arm portion 460 that may be urged to press on an end of the clutch pack 434. A seal 454 may be located between an inner annular surface of the arm portion 460 of first piston 430 to seal an outer radial portion of the first chamber 444. Another seal 456 may be located between an inner annular surface of the first piston 430 and a portion of the housing 402 to seal an inner radial portion of the first chamber 444.

The housing 402 may define a pressure chamber 448 in fluid communication with the distribution line 310 and the control valve 324 (referring to FIG. 3). When the control valve 324 is moved to the flow-passing position, the first piston 430 may be urged by the pressurized fluid directed from the control valve 324 via distribution line 310 to press against the clutch pack 434 with a first force resulting in a first torque on the corresponding components of the clutch 174. A seal 466 may be located between an outer annular surface of the first piston 430 to seal an outer radial portion of the pressure chamber 448. Another seal 468 may be located between an inner annular surface of the first piston 430 and an outer annular surface of the second piston 432 to seal an interface between the first and second pistons 430, 432.

Another seal 470 may be located between an inner annular surface of the second piston 432 and a portion of the housing 402 to seal an inner radial portion of the pressure chamber 448.

The second chamber 446 may be disposed between the second piston 432 and a portion of the housing 402. The second chamber 446 may be in fluid communication with the distribution line 331 and control valve 320 associated with the first clutch 170 (referring to FIG. 3). Seal 468 may seal an outer radial portion of the second chamber 446, while seal 470 may seal an inner radial portion of the second chamber 446. The second piston 432 may include an arm portion 462 that extends radially outward and may be urged to press on a shoulder 464 of the first piston 430. The second piston 432 may be selectively urged by the pressurized fluid in pressure chamber 448 to additionally urge the first piston 430 to touch up to the clutch pack 434 so as to rotationally lock the corresponding components of the clutch 174.

For example, whenever the clutch 170 is actuated together with the clutch 174, the second piston 432 is balanced with the pressurized fluid used to apply the clutch 170, which inhibits the second piston 432 from assisting the first piston 430 in touching up to the clutch pack 434. That is, when the control valve 320 is moved to the flow-passing position to actuate the clutch 170, pressurized fluid from the manifold 304 may also be simultaneously directed via the control valve 320 and a distribution line 331 into the second chamber 446 of the clutch 174 to oppose the urging of the second piston 432 by the pressurized fluid directed from the control valve 324 into pressure chamber 448. Thus, in such situations, the second piston 432 may be inhibited from assisting the first piston 430 in urging the first piston 430 to touch up to the clutch pack 434. Consequently, the first piston 430 continues to press against the clutch pack 434 with the first force resulting in the first torque on the corresponding components of the clutch 174.

However, when the clutch 170 is not actuated together with the clutch 174, the fluid in the second chamber 446 is no longer pressurized, and thus drops to a relatively low pressure, such as, for example, lube pressure, to bias the arm 462 of the second piston 432 away from the shoulder 464 of the first piston 430. Therefore, the second piston 432 may be urged by the pressurized fluid in pressure chamber 448 to press against the clutch pack 434 with a second force resulting in a second torque on the corresponding components of the clutch 174. Since the second piston 432 provides an additional working surface 466 to the first piston 430, the second torque is greater than the first torque generated by only the first piston 430.

In this manner, different levels of pushing force on clutch pack 434 may be generated by filling pressure chamber 448 and selectively filling second chamber 446. Accordingly, when shifting to the first reverse gear, clutch 174 may be actuated while clutch 170 is not actuated to generate a resistance of about 4.10 times the input torque (referring to FIG. 2) and, when shifting, for example, to the fourth forward gear, clutches 170, 174 may be utilized together to reduce the resistive torque of clutch 174 to about 0.59 times input torque. Similarly, the resistive torque of clutch 174 may be reduced in the fifth and eighth forward gears. By reducing the resistive torque of clutch 174 to a level just required to sufficiently lock planet carrier 150 to coupling 186 (i.e., ring gear 162, sun gear 144, sun gear 146), the engagement duration of clutch 174 may be extended and the shift quality of transmission assembly 118 may be improved.

INDUSTRIAL APPLICABILITY

While the transmission assembly of the present disclosure has potential application in any machine requiring multiple speed and torque transmission levels, the disclosed transmission assembly may be particularly applicable to off-highway mining trucks, articulated haul trucks, and other heavy construction machines. Such machines have specific gearing requirements that the disclosed transmission assembly may be capable of meeting. The disclosed transmission assembly may improve the shift quality of any machine by providing varying levels of clutch force actuation. Operation of transmission assembly 118 will now be described.

During operation of the machine, an operator or an automatic transmission controller may determine the need or desire to shift gears. When shifting to the first reverse gear, based on a signal from the operator or the automatic transmission controller, control valves 324, 326, and 330 may be moved to the flow-passing positions to direct pressurized fluid through distribution lines 310, 312, and 316 to clutches 174, 176, and 180, respectively (referring to FIG. 3). As fluid enters each of these clutches, associated pressure chambers thereof may be filled with the fluid and caused to push against their corresponding clutch packs to rotationally lock the appropriate components. For example, when control valve 224 is opened, first pressure chamber 448 (referring to FIG. 4) of clutch 174 may be filled with pressurized fluid, urging both of first and second pistons 430, 432 to move toward and press on an end of clutch pack 434, thereby pressing disks 450 against disks 452 and rotationally locking planet carrier 150 to coupling 186 (i.e., ring gear 162, sun gear 144, sun gear 146) of transmission assembly 118. Similarly, when control valve 326 is opened, clutch 176 may be filled with pressurized fluid, urging the associated clutch pack to rotationally lock sun gear 142 and ring gear 164 to housing 114. Likewise, when control valve 330 is opened, clutch 180 may be filled with pressurized fluid, urging the associated clutch pack to rotationally lock planet carrier 156 to housing 114. In this state, the resistive torque provided by clutches 174, 176, and 180 may be about 4.10, 0.94, and −6.23 times the torque received at input member 120, respectively.

Thus, in the first reverse gear, clutch 174 has a torque capacity of about 4.10. In the first reverse gear, clutch 174 is applied while clutch 170 is not. When shifting to a gear where clutches 170, 174 are both applied, such as, for example, fourth, fifth, and eight forward gears (referring to FIG. 2), the clutch 174 has a significantly lower torque capacity compared to gears where clutch 174 is applied while clutch 170 is not (i.e., ninth forward and first reverse gears).

For example, in the fourth forward gear, control valves 320, 324, and 328 may be moved to the flow-passing position to direct pressurized fluid through distribution lines 306, 310, 331, and 314 to clutches 170, 174, and 178 (referring to FIG. 3). As fluid enters each of these clutches, associated pressure chambers may be filled with the fluid and caused to push against their corresponding clutch packs to rotationally lock the appropriate components. For example, when control valve 320 is opened, first pressure chamber 422 (referring to FIG. 4) of clutch 170 may be filled with pressurized fluid, urging piston 408 to move toward and press on an end of clutch pack 404, thereby pressing disks 410 against disks 412 and rotationally locking planet carrier 150 to planet carrier 156 of transmission assembly 118. Likewise, when control valve 328 is opened, clutch 178 may be filled with pressurized fluid, causing the associated clutch pack to rotationally lock planet carrier 154 to housing 214. However, when control valve 324 is opened, pressure chamber 448 (referring to FIG. 4) of clutch 174 may be filled with pressurized fluid, urging both first and second pistons 430, 432 to move toward and press on an end of clutch pack 434. However, because control valve 320 may also open at this same time, second chamber 446 of clutch 174 may also be filled with pressurized fluid via distribution line 331, thereby inhibiting movement of second piston 432 toward first piston 430 and clutch pack 434. As a result, only first piston 430 may actually exert a force on clutch pack 434, pressing disks 450 against disks 452 and rotationally locking planet carrier 150 to coupling 186 (i.e., ring gear 162, sun gear 144, sun gear 146) of transmission assembly 118 with a lower resistive torque than exerted during shifting to the first reverse gear. In this state, the resistive torque provided by clutches 170, 174, and 178 may be about 3.51, 0.59, and 1.42 times the torque received at input member 120, respectively.

Clutch 170, 174 may also be actuated together in the fifth and eighth forward gears to reduce the resistive torque of clutch 174. By reducing the resistive torque of clutch 174, when shifting to the fourth, fifth, and eighth forward gears (as compared to the first reverse gear), the modulation time of clutch 174 (i.e., the time during which clutch 174 is filling with pressurized fluid and before disks 450 and 452 become completely locked) may be increased. This increased modulation time may help to improve a smoothness of the shift.

Numerous advantages may be associated with the disclosed transmission assembly. In particular, because the disclosed clutch designs may utilize existing control valves to provide the varying levels of clutch force actuation, the disclosed transmission system may be relatively simple and easy to control. Further, because first and second pistons 430, 432 may directly engage and push against each other, fewer components may be required and the number of potential leak paths reduced, thereby improving a durability of transmission assembly 118.

It will be apparent to those skilled in the art that various modifications and variations can be made to the transmission assembly of the present disclosure without departing from the scope of the disclosure. Other embodiments will be apparent to those skilled in the art from consideration of the specification and practice of the control system disclosed herein. It is intended that the specification and examples be considered as exemplary only.

What is claimed is:
1. A transmission assembly, comprising:
   a transmission housing;
   a first rotating member disposed radially inward of the transmission housing;
   a second rotating member disposed radially inward of the transmission housing;
   a first clutch, the first clutch including
      a first planet carrier;
      a second planet carrier; and
      a first clutch pack configured to rotationally lock the first planet carrier to the second planet carrier when actuated; and
   a second clutch, the second clutch including
      a second clutch pack;
      a pressure chamber;
      a first piston configured to push against the second clutch pack when pressurized fluid is directed into the pressure chamber and the second clutch pack being configured to rotationally lock the first rotating member to the second rotating member when pushed on by the first piston; and
      a second piston configured to push against the first piston when pressurized fluid is directed into the pressure chamber at a time when the first clutch is unactuated and inhibited from pushing against the first piston at a time when the first clutch is actuated.

2. The transmission assembly of claim 1, wherein the second piston is disposed radially inward of the first piston.

3. The transmission assembly of claim 2, further including a seal disposed between an inner annular surface of the first piston and an outer annular surface of the second piston.

4. The transmission assembly of claim 1, wherein the second piston is configured to push against the first piston to provide additional force against the second clutch pack.

5. The transmission assembly of claim 1, wherein the second clutch further includes a first chamber containing fluid at a pressure that inhibits the first piston from pushing against the second clutch pack when the second clutch is unactuated and allows the first piston to push against the second clutch pack when the second clutch is actuated.

6. The transmission assembly of claim 5, wherein the second clutch further includes a second chamber containing fluid at a first pressure when the first clutch is actuated and at a second pressure when the first clutch is unactuated, the first pressure being greater than the second pressure.

7. The transmission assembly of claim 6, wherein when the second chamber contains fluid at the first pressure, the second piston is inhibited from pushing against the first piston.

8. The transmission assembly of claim 6, wherein when the second chamber contains fluid at the second pressure, the second piston is permitted to push against the first piston when the second clutch is actuated.

9. The transmission assembly of claim 6, further including:
a first control valve movable to selectively allow pressurized fluid to actuate the first clutch; and
a second control valve movable to selectively allow pressurized fluid into the pressure chamber to actuate the second clutch.

10. The transmission assembly of claim 6, wherein when the first clutch is actuated, pressurized fluid is directed from the first control valve to the second chamber to inhibit the second piston from pushing against the first piston.

11. The transmission assembly of claim 1, wherein the first rotating member is a ring gear and the second rotating member includes a sun gear.

12. The transmission assembly of claim 1, wherein when the second clutch is actuated at a time when the first clutch is unactuated, the first piston exerts a force on the second clutch pack at least six times greater than when the second clutch is actuated at a time when the first clutch is actuated.

13. A method of operating a transmission, the transmission including a transmission housing, a first rotating member disposed radially inward of the transmission housing, and a second rotating member disposed radially inward of the transmission housing, the method comprising:
actuating a first clutch by pressurizing a first chamber of a first clutch to generate a first resistive torque on a first clutch pack during a transmission operation in a first gear, the first clutch pack being configured to rotationally lock the first rotating member to the second rotating member when pushed on by a first piston; and
actuating the first clutch and a second clutch during a transmission operation in a second gear to generate a second resistive torque on the first clutch pack less than the first resistive torque, the second clutch including a first planet carrier, a second planet carrier, and a second clutch pack configured to rotationally lock the first planet carrier to the second planet carrier when actuated, by
pressurizing the first chamber; and
actuating a control valve to direct pressurized fluid to both the second clutch and a second chamber of the first clutch, the pressurized fluid in the second chamber inhibiting a force applied to the first clutch pack to generate the second resistive torque.

14. The method of claim 13, wherein actuating the first clutch during the transmission operation in the first gear includes:
urging the first piston against the first clutch pack when pressurized fluid is directed into the first chamber; and
urging a second piston against the first piston to provide additional force against the first clutch pack.

15. The method of claim 13, wherein actuating the first clutch and the second clutch during the transmission operation in the second gear includes:
urging the first piston against the first clutch pack when pressurized fluid is directed into the first chamber; and
inhibiting a second piston from pushing against the first piston when pressurized fluid is directed into the second chamber.

16. The method of claim 13, wherein the first resistive torque is at least six times greater than the second resistive torque.

17. A transmission assembly, comprising:
a housing;
a sun gear;
a ring gear;
a first planet carrier;
a second planet carrier;
a first clutch configured to selectively lock the first planet carrier to the sun gear and the ring gear in a first gear and a second gear;
a second clutch configured to selectively lock the first planet carrier to the second planet carrier in the second gear;
a first chamber;
a second chamber;
a control valve configured to direct pressurized fluid to both the second clutch and the second chamber when the second clutch is activated;
a first piston configured to push against the first clutch pack with a first force when pressurized fluid is directed into the first chamber during operation of the transmission in the first gear and the second gear; and
a second piston configured to push against the first piston with a second force when pressurized fluid is directed into the first chamber during operation of the transmission in the first gear, and inhibited from pushing against the first piston when pressurized fluid is directed into the second chamber during operation in the second gear, the second force being supplemental to the first force.

* * * * *